United States Patent
Ikuma et al.

(10) Patent No.: US 7,535,118 B2
(45) Date of Patent: May 19, 2009

(54) POWER SUPPLY SYSTEM AND FUEL CELL UNIT

(75) Inventors: Hitoshi Ikuma, Tokyo (JP); Makoto Inoue, Tokyo (JP)

(73) Assignee: The Japan Research Institute, Limited, Tokyo (JP)

( * ) Notice: Subject to any disclaimer, the term of this patent is extended or adjusted under 35 U.S.C. 154(b) by 873 days.

(21) Appl. No.: 10/898,679

(22) Filed: Jul. 23, 2004

(65) Prior Publication Data

US 2005/0084721 A1    Apr. 21, 2005

Related U.S. Application Data

(60) Provisional application No. 60/489,722, filed on Jul. 23, 2003.

(51) Int. Cl.
*H02J 1/00* (2006.01)
*H02J 3/00* (2006.01)
*H02J 3/14* (2006.01)

(52) U.S. Cl. .............................. 307/38; 307/39; 307/52; 307/17

(58) Field of Classification Search ................... 307/52, 307/38, 39, 17, 29
See application file for complete search history.

(56) References Cited

U.S. PATENT DOCUMENTS 5,436,510 A * 7/1995 Gilbert ......................... 307/38

7,105,946 B2 * 9/2006 Akiyama et al. ............... 307/16
2002/0102447 A1 * 8/2002 Kato ............................. 429/23

FOREIGN PATENT DOCUMENTS

| JP | 04-222420 | 8/1992 |
|----|-----------|--------|
| JP | 09-231991 | 9/1997 |
| JP | 2000-261962 | 9/2000 |
| JP | 2001-025179 | 1/2001 |
| JP | 2001-145262 | 5/2001 |
| JP | 2001-339857 | 12/2001 |

* cited by examiner

*Primary Examiner*—Stephen W Jackson
*Assistant Examiner*—Carlos Amaya
(74) *Attorney, Agent, or Firm*—J.C. Patents

(57) ABSTRACT

There is provided a power supply system for supplying power to a plurality of loads includes: a fuel cell for generating DC power; a plurality of connection units, wherein one of the plurality of connection units receives information to decide power consumption of the load from the load when any of the plurality of loads is connected to any of the connection units; and a control unit operable to compute the power consumption of the load based on the information received by the connection unit when power supply is requested from another load among the plurality of loads connected to the connection unit, and operable to inform a user of power shortage without supplying power to the load when the power consumption of the load is higher than surplus power of the fuel cell, in a state where power is supplied to at least one of the plurality of loads.

14 Claims, 6 Drawing Sheets

| CONNECTED LOAD | STATUS | OPERATION STATUS | POWER CONSUMPTION |
|---|---|---|---|
| • LOAD A | IN OPERATION | | 100W |
| • LOAD B | IN OPERATION | | 300W |
| • LOAD C | IN OPERATION | | 200W |
| • LOAD D | IN LOW OPERATION | | 80W |
| • LOAD E | | LOAD B OFF | 500W |
| ⋮ | ⋮ | ⋮ | ⋮ |
| SURPLUS POWER 210W | | | |

DISPLAY UNIT 70

FIG. 3

POWER SUPPLY SYSTEM AND FUEL CELL UNIT

This patent application relates to a Japanese Patent Application No. 2003-55968 filed on Mar. 3, 2003, the contents of which are incorporated herein by reference. This patent application claims priority from a U.S. Provisional Application No. 60/489,722 filed on Jul. 23, 2003, the contents of which are also incorporated herein by reference.

BACKGROUND OF THE INVENTION

1. Field of the Invention

The present invention relates to a power supply system for supplying power to loads, and a fuel cell unit. More particularly, the present invention relates to a power supply system having a fuel cell.

2. Description of the Related Art

Conventionally, a solar power generation, a fuel cell, etc. have been considered to be an auxiliary power source of an electric power system in each house. In addition, the increase of power demand in recent years will cause a shortage of power supply from the electric power system in the near future. For this reason, power supply to each house will be heavily dependent on a solar power generation, a fuel cell, etc. In other words, it is expected that a fuel cell and on the like will be employed as an auxiliary power source in the past function as a main power source in each house.

However, electric power generation of the fuel cell installed in each house is limited compared with the electric power generation of the electric power system. Therefore, supply shortage caused by higher demand capability than electric power generation of the fuel cell in each house may increase compared with the power supply from the current electric power system. In this case, it is not preferable to break the power supply to all loads by a breaker as the current power supplying method from the current electric power system because the frequency of supply shortage increases. In addition, it is necessary to install a high capacity fuel cell to prevent supply shortage. However, it is not preferable in economical efficiency.

SUMMARY OF THE INVENTION

Therefore, it is an object of the present invention to provide a power supply system and a fuel cell unit, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a power supply system for supplying power to a plurality of loads includes: a fuel cell for generating DC power; a plurality of connection units, wherein one of the plurality of connection units receives information to decide power consumption of the load from the load when any of the plurality of loads is connected to any of the connection units; and a control unit operable to compute the power consumption of the load based on the information received by the connection unit when power supply is requested from another load among the plurality of loads connected to the connection unit, and operable to inform a user of power shortage without supplying power to the load when the power consumption of the load is higher than surplus power of the fuel cell, in a state where power is supplied to at least one of the plurality of loads.

The connection unit may receive load identification information to identify the connected load from the load, the control unit may include: a power consumption storing unit operable to decide maximum power consumption of each of the loads and store them in association with the load identification information on each load; a power consumption deciding unit operable to receive the load identification information from the connection unit and retrieve the power consumption corresponding to the load identification information from the power consumption storing unit; and a comparison unit operable to compare the power consumption retrieved by the power consumption deciding unit with the surplus power of the fuel cell.

The power supply system may further include a display unit operable to display a list of loads connected to the connection units, a power consumption list of each of the connected loads, a list of loads being supplied with power from the fuel cell among the loads connected to the connection units, and the surplus power of the fuel cell.

The control unit decides which load is to be suspended from usage among the plurality of loads, which are supplied with the power, to supply the power to the other load based on the power consumption stored on the power consumption storing unit and the surplus power of the fuel cell when the control unit decides that the power consumption of the other load is higher than the surplus power, and the display unit displays which load is to be suspended from usage among the plurality of loads, which are supplied with the power, to supply the power to the other load based on the decided result of the control unit.

The power supply system may further include an electricity accumulation unit having shorter response time than that of the fuel cell with regard to power supply, the electricity accumulation unit being charged by the fuel cell, and the control unit may be operable to supply power from the electricity accumulation unit to the load within a predetermined response period after a power-supply request from the load, while supplying power from the fuel cell to the load after the predetermined response period has been elapsed.

Power consumption of the loads may vary depending on operating conditions, and when the control unit receives a request of power supply from a load whose power consumption is higher than the surplus power, the control unit may supply the surplus power to the load and send to the load a control signal to operate the load under the operating conditions corresponding to the surplus power.

The power supply system may further include a display unit operable to indicate that the load is operating with low power when the control unit sends the control signal to the load. In addition, the power supply system may further include a switching unit operable to selectively connect the connection units with an external power source, wherein the control unit causes the switching unit to connect the connection unit with the external power source to supply power from the external power source to the load via the connection unit when the control unit receives a request of power supply from the load connected to the connection unit of which the power consumption is higher than the surplus power of the fuel cell.

The power supply system may further include a display unit operable to indicate that the power is being supplied to the load from the external power source. When the control unit receives a request of additional power from the load to which an amount of power has been already supplied when the additional power is lower than the surplus power, the control unit increases power supplied to the load when the additional power is lower than the surplus power, and the control unit informs the user of power shortage without increasing power supplied to the load when the additional power is higher than the surplus power.

The connection unit may receive the load identification information via a power line for transmitting power to the load. The power supply system may further include: transformers operable to transform DC power generated by the fuel cell into a desired voltage; a DC/AC converter operable to convert the DC power generated by the fuel cell into AC power, wherein the DC/AC converter is provided in parallel with the transformers; and DC/AC switching units operable to select whether either of the transformers or the DC/AC converter is to be connected to the connection units, wherein the control unit may decide whether the load connected to the connection unit is operated by either of the DC power or the AC power and to control the DC/AC switching unit based on the decided result.

The connection unit may receive load identification information to identify the connected load from the load, the control unit may include: a power-type storing unit operable to associate a power type of each of the loads, i.e., the DC power or the AC power, with the load identification information on each of the loads and to store them; and a power type deciding unit operable to receive the load identification information from the connection unit and to decide whether the load is operated by either of the DC power or the AC power based on the load identification information.

The power supply system may be connected to an external power source which generates DC power, the power supply system further includes a switching unit operable to select whether the DC power of the external power source is supplied to the DC/AC converter and the transformers, and the control unit may control the switching unit to supply the DC power of the external power source to the DC/AC converter and the transformers.

The power supply system may be connected to an external power source which generates AC power, the power supply system further includes: an AC/DC converter operable to convert AC power of the external power source into DC power; a first switch operable to select whether the DC power converted by the AC/DC converter is supplied to the transformers; and a second switch operable to select whether the AC power of the external power source is supplied to the connection units, wherein the control unit may control the first switch and the second switch based on the comparison result of the power consumption of the load connected to the connection unit with the surplus power of the fuel cell, and also based on the decision result of deciding whether the load is operated by the DC power or the AC power.

A fuel cell unit for generating power to be supplied to loads includes: a fuel cell for generating DC power; and a control unit operable to compare power consumption of the load with surplus power of the fuel cell and to inform a user of power shortage without supplying power to the load when the power consumption is higher than the surplus power.

The summary of the invention does not necessarily describe all necessary features of the present invention. The present invention may also be a sub-combination of the features described above.

BRIEF DESCRIPTION OF THE DRAWINGS

FIG. 3 is a drawing exemplary showing indication on a display unit 70.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
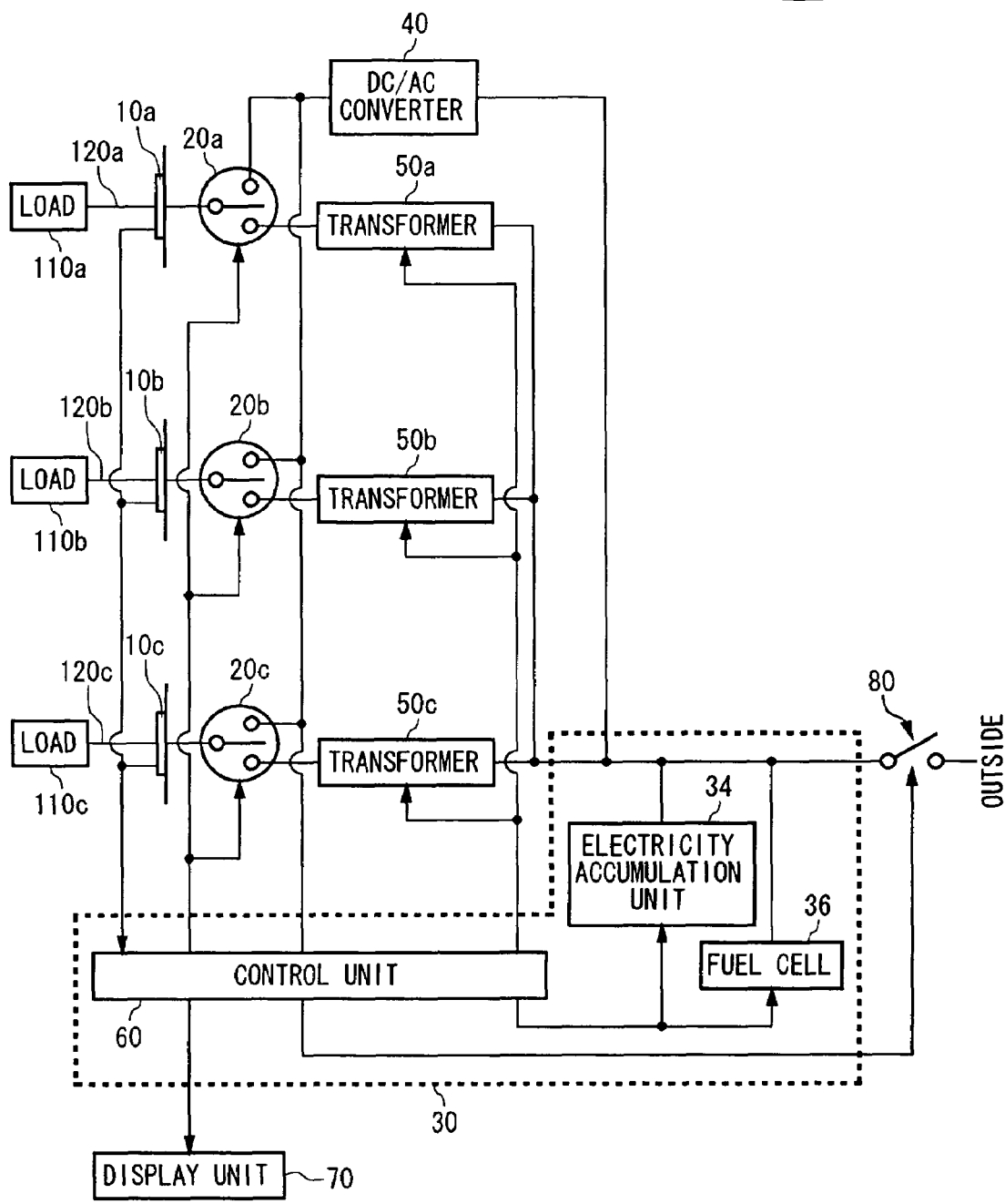
FIG. 1 is a block diagram exemplary showing a configuration of a power supply system 100 according to an embodiment of the present invention.

FIG. 1 is a block diagram exemplary showing a configuration of a power supply system 100 according to an embodiment of the present invention. The power supply system 100 according to the present embodiment is, for example, a system for supplying power to a plurality of loads provided in one house. The power supply system 100 decides whether the electric power can be supplied to each of the loads based on power consumption of each of the loads before the power is supplied to the loads.

The power supply system 100 includes a plurality of connection units 10a, 10b, 10c (hereinafter, referred to as 10), a plurality of DC/AC switching units 20a, 20b, 20c (hereinafter, referred to as 20), a fuel cell unit 30, a DC/AC converter 40, a plurality of transformers 50a, 50b, 50c (hereinafter, referred to as 50), a display unit 70, and a switching unit 80. Furthermore, the fuel cell unit 30 includes a fuel cell 36 for generating DC power, an electricity accumulation unit 34 that is charged by the fuel cell 36 and has shorter response time than that of the fuel cell 36 with regard to power supply, and a control unit 60 operable to control the power supply system 100.

When any of a plurality of loads 110a, 110b, 110c (hereinafter, referred to as 110) is connected to any of the plurality of connection units 10, the connection unit 10 receives information from the connected load 110 to decide the power consumption of the connected load 110. For example, the connection unit 10 may be a plug outlet provided in the house for supplying power to the loads. In the present embodiment, the connection units 10 receive identification information to identify each of the loads through power lines for transmitting power to the loads 110.

In a state that the power supply system 100 supplies power to at least one of the plurality of loads 110, when there is a demand for power from another load 110, to which the power is not supplied, out of the plurality of loads 110 connected to the connection units 10, the control unit 60 computes the power consumption of the load 110 based on the load identification information received by the connection unit 10 connected to the other load 110.

Then, the control unit 60 informs a user of power shortage without supplying power to the load 110 when the computed power consumption is higher than surplus power of the fuel cell 36. The surplus power of the fuel cell 36 can be easily obtained by computing difference between power currently supplied by the fuel cell 36 and maximum electric power generation of the fuel cell 36. In addition, it is preferable that the power consumption of each of the loads 110 is associated with the load identification information for identifying each of the loads 110. In this case, it is possible to easily compare the power consumption of each of the loads 110 and the surplus power of the fuel cell 36. Therefore, the power supply system 100 can decide whether the power is to be supplied to the load 110 before supplying power to the load 110 when power supply is newly requested from the load, thereby preventing interruption of power supply to all loads 110.

Additionally, the control unit 60 informs the user of power shortage by displaying it on the display unit 70. In this case, the user can easily confirm a shortage of the surplus power of the fuel cell 36.

The control unit 60 makes the power to be supplied from the fuel cell 36 to the load 110 when the computed power consumption is lower than the surplus power of the fuel cell 36. In this case, the control unit 60 increases a power generation of the fuel cell 36 by the power consumption of the load 110 to supply the power to the load 110.

Moreover, the power supply system 100 may supply DC power or AC power to the loads 110. In this case, the control unit 60 can decide whether each of the loads 110 is operated by either of the DC power or the AC power based on each of the load identification information. For example, it is preferable that the control unit 60 associates the power type of each of the loads with the load identification information on each of the loads.

The DC/AC switching units 20 are provided corresponding to each of the connection units 10 and select whether the loads 110 connected to the corresponding connection units 10 are supplied with either of the DC power or the AC power. The control unit 60 controls the DC/AC switching units 20, thereby supplying power of the suitable power type for each of the loads to each of the loads.

When the loads 110 are supplied with the DC power, the DC power generated by the fuel cell 36 is supplied to the loads 110 via the transformers 50. The transformers 50 are provided corresponding to each of the DC/AC switching units 20, transforming the DC power generated by the fuel cell 36 into a desired power according to the loads 110 to be supplied with power to supply it to the DC/AC switching units 20.

In addition, when the loads 110 are supplied with the AC power, the power generated by the fuel cell 36 is supplied to the loads 110 via the DC/AC converter 40. The DC/AC converter 40 is provided in parallel with each of the transformers 50, converting the DC power generated by the fuel cell 36 into the AC power to supply it to the DC/AC switching units 20.

The control unit 60 decides whether each of the loads 110 connected to the connection units 10 is operated by either of the DC power or the AC power and to control the DC/AC switching units 20 based on the decided results, and each of the DC/AC switching units 20 selects whether any of the corresponding transformers 50 and the DC/AC converter 40 are connected to the corresponding connection units 10.

In this case, either of the DC power or the AC power can de selected according to the power type of the loads 110 to supply it to the corresponding load 110. Therefore, although the load 110 is operated by the DC power, it is not necessary that the load 110 has a converter for converting the AC power into the DC power. Conventionally, the AC power of a commercial power source had to be converted into the DC power when supplying the DC power to the load. However, the power supply system 100 does not need such a conversion. Therefore, power loss due to the conversion can be decreased.

Furthermore, it is preferable that the control unit 60 makes the power to be supplied from the electricity accumulation unit 34 s to the load 110 within a predetermined response period after a power-supply request from the load 110, while making the power to be supplied from the fuel cell 36 to the load 110 after the predetermined response period has been elapsed. Here, the response period may be, for example, start-up time of the fuel cell 36 or response time of the fuel cell 36 according to an increment of the power. Therefore, the loads 100 can be stably supplied with power even when a power generation of the fuel cell 36 cannot cope with a change of the power consumption.

In addition, when the control unit 60 receives a power-supply request from the load 110 connected to the connection unit 10 of which the power consumption is higher than the surplus power of the fuel cell 36, the control unit 60 may allow the switching unit 80 to connect the connection unit 10 with an external power source and to supply power from the external power source to the load 110 via the connection unit 10. The switching unit 80 may be, for example, a switch for selecting whether the connection unit 10 is connected to the external power source. In the present embodiment, the external power source may be another power supply system for generating DC power. In this case, although total power consumption of the plurality of loads 110 is higher than the maximum electric power generation of the fuel cell 36, power shortage can be compensated from the outside. Moreover, since the power supply system according to the present invention supplies and receives power to/from the external power supply system using DC power, transfer of power can be performed efficiently.

Figure 2:
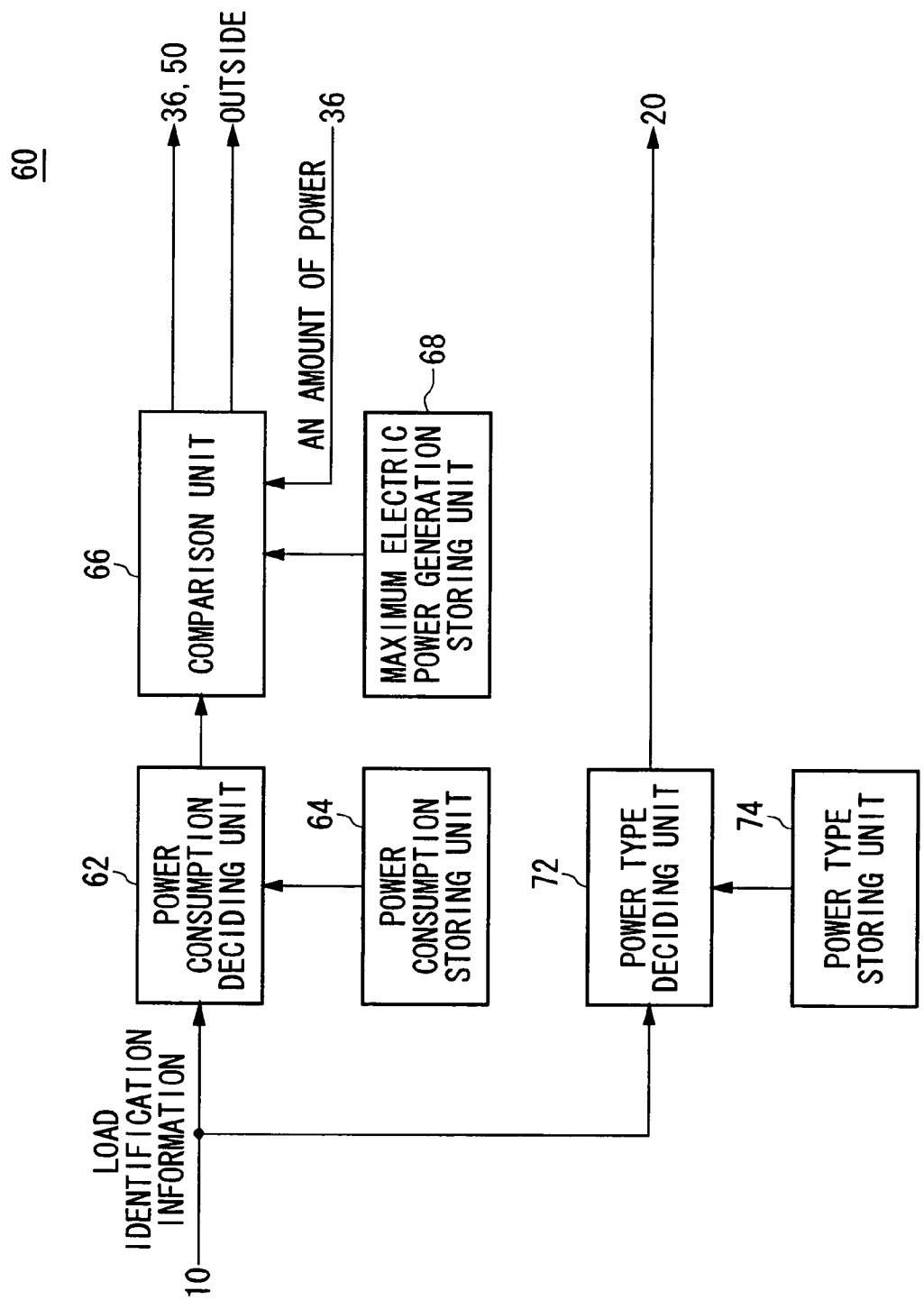
FIG. 2 is a block diagram exemplary showing a configuration of a control unit 60.

FIG. 2 is a block diagram exemplary showing a configuration of the control unit 60. The control unit 60 includes a power consumption deciding unit 62, a power consumption storing unit 64, a comparison unit 66, a maximum electric power generation storing unit 68, a power type deciding unit 72, and a power-type storing unit 74.

The power consumption storing unit 64 associates the power consumption of each of the loads 110 with the load identification information on each of the loads 110 and to store them thereon. Furthermore, the power consumption storing unit 64 may store the maximum power consumption of each of the loads 110. These values of the power consumption may be determined in advance, or measured by the power consumption deciding unit 62, or supplied from each of the loads 110 connected to the connection units 10.

The power consumption deciding unit 62 receives the load identification information on the load 110 connected to the connection unit 10 from the connection unit 10 and retrieves the power consumption corresponding to the load identification information from the power consumption storing unit 64. The comparison unit 66 compares the power consumption retrieved by the power consumption deciding unit 62 with the surplus power of the fuel cell 36. In the present embodiment, the maximum electric power generation storing unit 68 stores the maximum electric power generation of the fuel cell 36 in advance. Then, the comparison unit 66 detects a power generation of the fuel cell 36 and computes the surplus power of the fuel cell 36 based on the difference between the power generation and the maximum electric power generation of the fuel cell 36.

The comparison unit 66 decides whether to supply the power to the load 110 or not based on the comparison result of the surplus power and the power consumption. When the power is to be supplied to the load 110, the comparison unit 66 controls the fuel cell 36 and the transformer 50 as described above. Furthermore, the comparison unit 66 may inform the exterior on the surplus power of the fuel cell 36.

The power-type storing unit 74 associates a power type to be supplied to each of the loads 110, i.e., the DC power or the AC power, with the load identification information on each of the loads 110 and to store them thereon. As the value of the power consumption of the power consumption storing unit 64, the power type of the power-type storing unit 74 may be determined in advance, or decided by the power type deciding unit 72, or given from each of the loads 110.

The power type deciding unit 72 receives the load identification information from each of the connection units 10 to retrieve the power type corresponding to the load identification information from the power-type storing unit 74, and to decide whether each of the loads 110 is operated by either of the DC power or the AC power. Then, the power type deciding unit 72 controls each of the DC/AC switching units 20 based on the decision results.

FIG. 3 is a drawing exemplary showing indication on the display unit 70. As shown in FIG. 3, the display unit 70 displays a list of loads 110 connected to the connection units 10, a power consumption list of each of the connected loads 110, a list of loads 110 supplied with power from the fuel cell 36 among the loads 110 connected to the connection units 10, and the surplus power of the fuel cell 36. In this case, the user can easily recognize operation status of each of the loads 110. In addition, when the load 110, which has higher power consumption than the surplus power of the fuel cell 36, has to be operated additionally, it can be easily decided whether the new load 110 can be used by interrupting the use of any of the other loads 110.

In addition, as shown in FIG. 3, the display unit 70 may display operation status representing whether the power is to be supplied to the other additionally-operating load 110 when the power supply to any of the loads 110 stops. In this case, when the control unit 60 decides that the power consumption of the additionally-operating other load 110 is higher than the surplus power of the fuel cell 36, the control unit 60 decides which load 110 is to be suspended from usage among the plurality of loads 110, which are supplied with the power, to supply the power to the additionally-operating load 110 based on the power consumption stored on the power consumption storing unit 64 and also based on the surplus power of the fuel cell 36. Then, the display unit 70 displays operation status based on the decision result of the control unit 60.

Moreover, when the connection unit 10 receives a request of power supply from the load 110, of which the power consumption varies depending on the condition of the load and of which the power consumption is higher than the surplus power of the fuel cell 36, the control unit 60 supplies the power lower than the surplus power of the fuel cell 36 to the load 110. In this case, the control unit 60 sends a control signal to operate the load 110 under the operation conditions corresponding to the power supplied to the load 110. For example, the load 110 may be an air conditioner. When the power consumption varies depending on current temperature, the control unit 60 sends a control signal to operate the air conditioner in the range of preset temperature according to the power to be supplied.

In this way, the display unit 70 indicates that the load 110 is operating with low power when the control unit 60 sends the control signal to the load 110. Additionally, the display unit 70 may further indicate range of the room temperature adjustable be the user when the load 110 is an air conditioner, for example.

Moreover, when the power is supplied to the load 110 from the external power source as described with reference to FIG. 1, the display unit 70 may indicate the status. For example, the display unit 70 may further indicate unit cost of a commercial power source and monthly electricity charges when the user buys the power from the commercial power source.

Furthermore, when the surplus power of the fuel cell 36 is lower than a predetermined threshold, the display unit 70 may indicate a warning of the status. The display unit 70 may indicate the average power consumption and the maximum power consumption as the power consumption of each of the loads 110.

Figure 4:
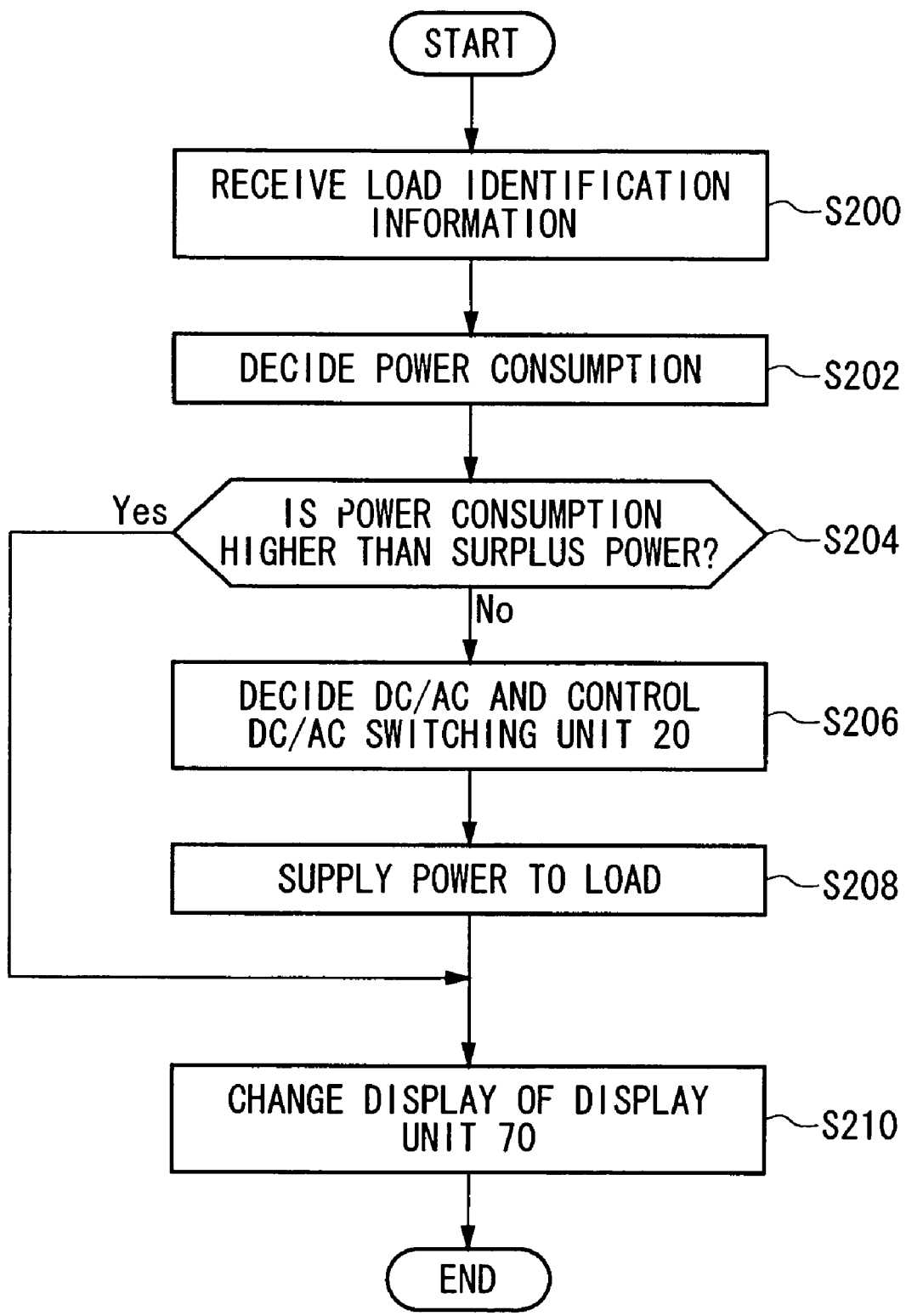
FIG. 4 is a flow chart exemplary showing operations of the power supply system 100.

FIG. 4 is a flow chart exemplary showing operations of the power supply system 100. In the embodiment, operations for the case of deciding whether the load 110 is supplied with power will be described. First, the connection unit 10 receives the load identification information from the connected load 110 (S200).

Next, the control unit 60 decides the power consumption of the load 110 connected to the connection unit 10 (S202). Then, the control unit 60 decides whether the power consumption of the load 110 is higher than the surplus power of the fuel cell 36 (S204). When the power consumption is higher than the surplus power, the display unit 70 indicate that a warning of the power shortage (S210). Then, the process is terminated.

In addition, when the power consumption is lower than the surplus power in the step S204, the control unit 60 decides whether the load 110 is operated by either of the DC power or the AC power and controls the DC/AC switching unit 20 based on the decided result (S206).

Then, the control unit 60 increases a power generation of the fuel cell 36 to supply the power to the load 110 (S208), allowing the display unit 70 to display the status that the power is being supplied to the load 110 (S210).

Furthermore, when the connection unit 10 receives a request for the additional power from the load 110 that is already supplied with power, the connection unit 10 may further receive an amount of additional power required to the load 110 in the step S200. Then, in the step S204, the control unit 60 decides whether the additional power is higher than the surplus power of the fuel cell 36. When the additional power is higher than the surplus power, the control unit 60 informs the user of power shortage without increasing the power to be supplied to the load in the step S210. Meanwhile, when the additional power is lower than the surplus power, the control unit 60 increases a power generation of the fuel cell 36, thereby increasing power to be supplied to the load 110.

Figure 5:
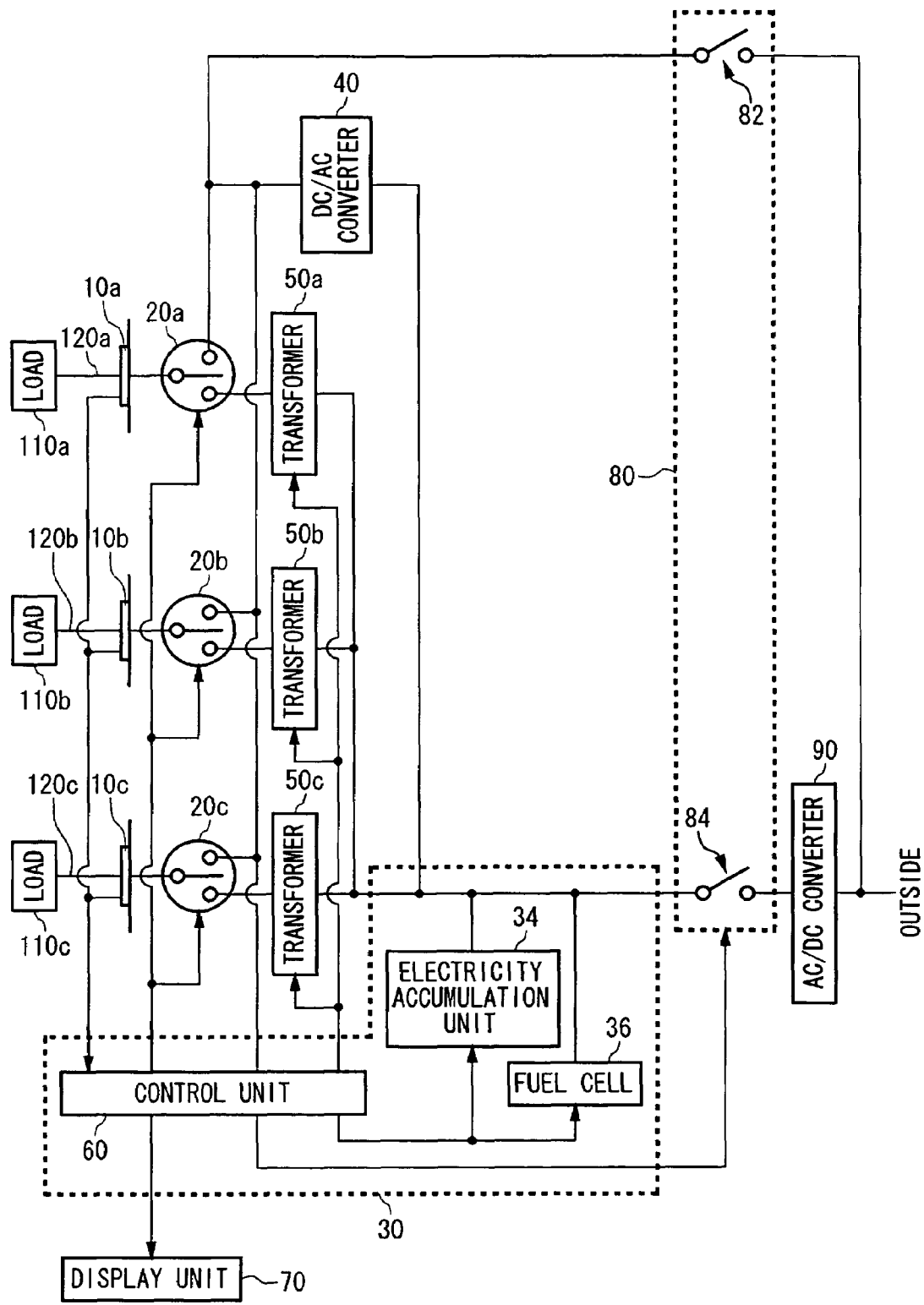
FIG. 5 is a block diagram showing another example of the configuration of the power supply system 100.

FIG. 5 is a block diagram showing another example of the configuration of the power supply system 100. In the present embodiment, the power supply system 100 is connected to an external power source which generates AC power, and received power from the external power source when electric power generation of the fuel cell 36 is insufficient. For example, the external power source is a commercial power source.

In addition to the configuration of the power supply system 100 shown in FIG. 1, the power supply system 100 according to the present embodiment further includes an AC/DC converter 90 for converting the AC power generated by the external power source into DC power. The switching unit 80 according to the present embodiment includes a first switch 84 for selecting whether the DC power converted by the AC/DC converter 90 is to be supplied to each of the transformers 50, and a second switch 82 for selecting whether the AC power of the external power source is to be supplied to each of the connection units 10. Since, the elements in FIG. 5 bearing the same reference numerals as those in FIG. 1 have the same or similar function and configuration as/to the elements described with regard to FIG. 1.

In the present embodiment, the control unit 60 controls the first switch 84 and the second switch 82 based on the comparison result of the power consumption of the load 110 connected to the connection unit 10 and the surplus power of the fuel cell 36, and also based on the decision result of deciding whether the load 110 is operated by the DC power or the AC power. For example, when the power consumption of the load 110 is higher than the surplus power of the fuel cell 36, the control unit 60 controls the switching unit 80 to supply the power from the external power source to the load 110. At this time, the control unit 60 closes one of the first switch 84 and the second switch 82, and closes the other based on the decision result of deciding whether the load 110 is operated by the DC power or the AC power.

According to the power supply system 100 of the present embodiment, it is possible to use the conventional commercial power source as a backup power source by simple configuration, thereby improving the stability of the power supply.

Figure 6:
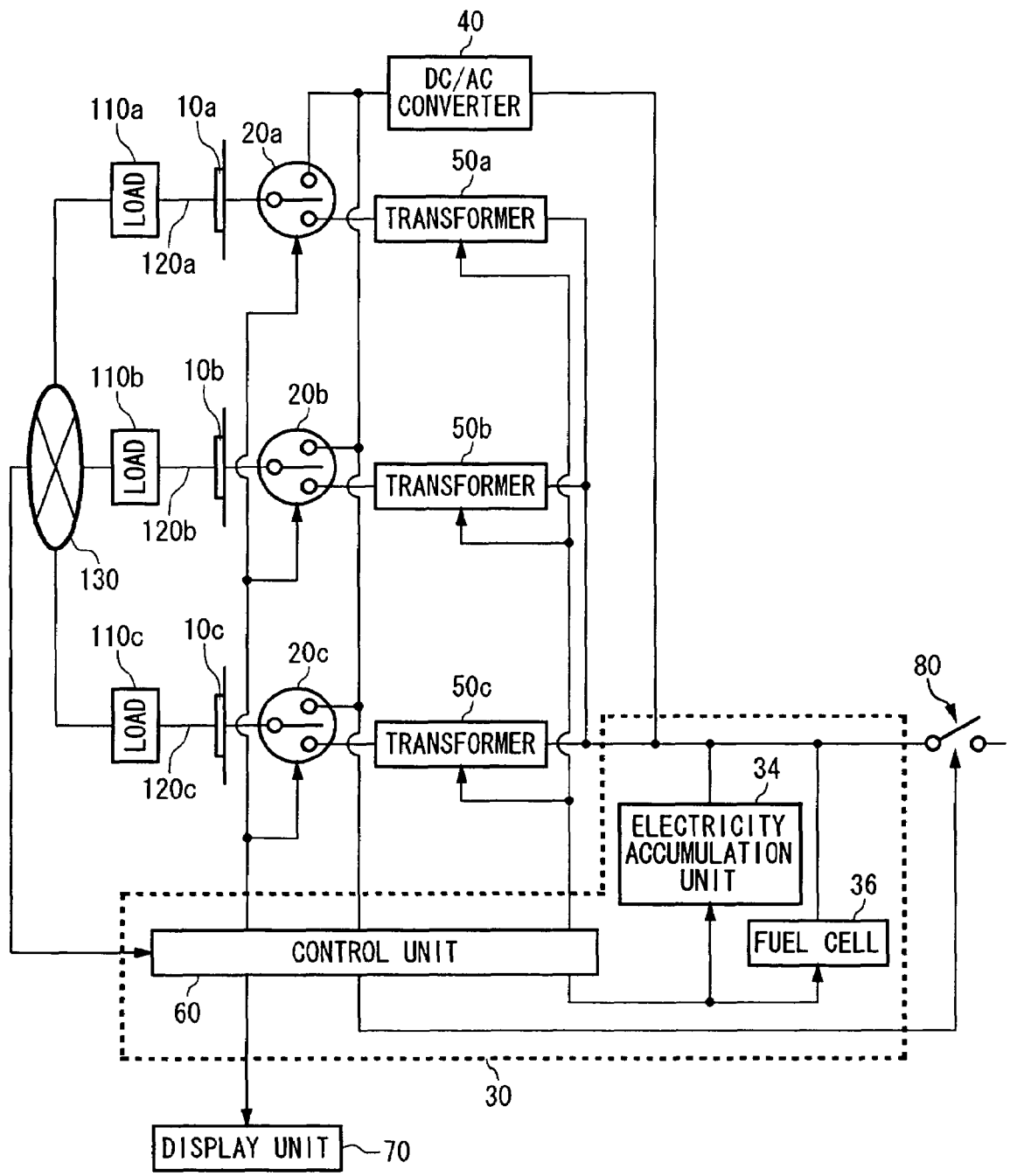
FIG. 6 is a block diagram showing yet another example of the configuration of the power supply system 100.

FIG. 6 is a block diagram showing yet another example of the configuration of the power supply system 100. The power supply system 100 according to the present embodiment further includes a network 130 in addition to the configuration of the power supply system 100 shown in FIG. 1. Each of the loads 110 is connected to the network 130 to form a household electrical network. Here, the household electrical network is a network which shares the information on each of the loads 110 among the loads 110 for linking the operation of one load 110 with the operation of the other loads 110.

For example, when setting power-off time of one of the loads 110, the household electrical network operates so as to turn off any load 110 simultaneously. In the present embodiment, the control unit 60 performs such the control.

In the present embodiment, the control unit 60 receives the load identification information on each of the loads 110 connected to the connection units 10 via the network 130. Then, the control unit 60 decides the power consumption of one load 110 which needs the power supply based on the received load identification information. In addition, the control unit 60 may further decide the power consumption of the other loads 110 that operate in conjunction with the load 110 that needs the power supply. In this case, when the sum of the power consumption of one load 110 and the power consumption of the other loads 110 is lower than the surplus power of the fuel cell 36, the control unit 60 may supply power to each of the loads 110. However, when only one load 110 can be supplied with power, the control unit 60 may cause the display unit 70 to indicate the status and may supply power to the load 110 only.

In this way, it is possible to efficiently perform the control of the loads 110 and the control of power supply by performing the control of power supply and the control of household electrical network in the integrated manner.

Although the present invention has been described by way of exemplary embodiments, it should be understood that those skilled in the art might make many changes and substitutions without departing from the spirit and the scope of the present invention which is defined only by the appended claims.

As obvious from the description above, according to the present invention, it is possible to provide a power supply system capable of preventing interruption of the entire system because it decides whether power can be supplied to a load before supplying the power to the load. That is, although the power is to be supplied to a plurality of loads from a fuel cell having the limited electric power generation, the required power to the loads can be supplied appropriately.

What is claimed is:

1. A power supply system for supplying power to a plurality of loads, comprising:
   a fuel cell for generating DC power;
   a plurality of connection units, wherein one of said plurality of connection units receives information to decide power consumption of the load from the load when any of the plurality of loads is connected to any of said connection units;
   a control unit operable to compute the power consumption of the load based on the information received by said connection unit when power supply is requested from another load among the plurality of loads connected to said connection unit, and operable to inform a user of power shortage without supplying power to the load when the power consumption of the load is higher than surplus power of said fuel cell, in a state where power is supplied to at least one of the plurality of loads;
   transformers operable to transform DC power generated by said fuel cell into a desired voltage;
   a DC/AC converter operable to convert the DC power generated by said fuel cell into AC power, wherein said DC/AC converter is provided in parallel with said transformers; and
   DC/AC switching units for selecting whether either of said transformers or said DC/AC converter is to be connected to said connection units,
   wherein said control unit decides whether the load connected to said connection unit is operated by either of the DC power or the AC power and to control said DC/AC switching unit based on the decided result.

2. The power supply system as claimed in claim 1, wherein said connection unit receives load identification information to identify the connected load from the load, and
   said control unit comprises:
   a power consumption storing unit operable to decide maximum power consumption of each of the loads and store them in association with the load identification information on each load;
   a power consumption deciding unit operable to receive the load identification information from said connection unit and retrieve the power consumption corresponding to the load identification information from said power consumption storing unit; and
   a comparison unit operable to compare the power consumption retrieved by said power consumption deciding unit with the surplus power of said fuel cell.

3. The power supply system as claimed in claim 2, further comprising a display unit operable to display a list of loads connected to said connection units, a power consumption list of each of the connected loads, a list of loads being supplied with power from said fuel cell among the loads connected to said connection units, and the surplus power of said fuel cell.

4. The power supply system as claimed in claim 3, wherein said control unit decides which load is to be suspended from usage among the plurality of loads, which are supplied with the power, to supply the power to the other load based on the power consumption stored on said power consumption storing unit and the surplus power of said fuel cell when said control unit decides that the power consumption of the other load is higher that than the surplus power, and
   said display unit displays which load is to be suspended from usage among the plurality of loads, which are supplied with the power, to supply the power to the other load based on the decided result of said control unit.

5. The power supply system as claimed in claim 3, further comprising an electricity accumulation unit having shorter response time than that of said fuel cell with regard to power supply, said electricity accumulation unit being charged by said fuel cell, wherein said control unit is operable to supply power from said electricity accumulation unit to the load within a predetermined response period after a power-supply request from the load, while supplying power from said fuel cell to the load after the predetermined response period has elapsed.

6. The power supply system as claimed in claim 2, wherein said connection unit receives the load identification information via a power line for transmitting power to the load.

7. The power supply system as claimed in claim 1, wherein power consumption of the loads varies depending on operating conditions, and
said control unit supplies the surplus power to the load and sends to the load a control signal to operate the load under the operating conditions corresponding to the surplus power when the power consumption of the load whose request of power supply is received by said control unit is higher than the surplus power.

8. The power supply system as claimed in claim 7, further comprising a display unit operable to indicate that the load is operating with low power when said control unit sends the control signal to the load.

9. The power supply system as claimed in claim 1, further comprising a switching unit operable to selectively connect or not to connect said connection units with an external power source,
wherein said control unit causes said switching unit to connect said connection unit with the external power source to supply power from the external power source to the load via said connection unit when said control unit receives a request of power supply from the load connected to said connection unit of which the power consumption is higher that than the surplus power of said fuel cell.

10. The power supply system as claimed in claim 9, further comprising a display unit operable to indicate that the power is being supplied to the load from the external power source.

11. The power supply system as claimed in claim 1, wherein
when said control unit receives a request of additional power from the load to which an amount of power has been already supplied when the additional power is Lower than the surplus power,
said control unit increases power supplied to the load when the additional power is lower than the surplus power, and said control unit informs the user of power shortage without increasing power supplied to the load when the additional power is higher than the surplus power.

12. The power supply system as claimed in claim 1, wherein said connection unit receives load identification information to identify the connected load from the load, and said control unit comprises:
a power type storing unit operable to associate a power type of each of the loads, the DC power or the AC power, with the load identification information on each of the loads and to store them; and
a power type deciding unit operable to receive the load identification information from said connection unit and to decide whether the load is operated by either of the DC power or the AC power based on the load identification information.

13. The power supply system as claimed in claim 1, wherein said power supply system is connected to an external power source which generates DC power,
the power supply system further comprises a switching unit operable to select whether the DC power of the external power source is supplied to said DC/AC converter and said transformers, and
said control unit controls said switching unit to supply the DC power of the external power source to said DC/AC converter and said transformers.

14. The power supply system as claimed in claim 1, wherein said power supply system is connected to an external power source which generates AC power,
the power supply system further comprises:
an AC/DC converter operable to convert AC power of the external power source into DC power;
a first switch operable to select whether the DC power converted by said AC/DC converter is supplied to said transformers; and
a second switch operable to select whether the AC power of the external power source is supplied to said connection units, and
said control unit controls said first switch and said second switch based on the comparison result of the power consumption of the load connected to said connection unit with the surplus power of said fuel cell, and also based on the decision result of deciding whether the load is operated by the DC power or the AC power.

* * * * *